(12) United States Patent
Baumann et al.

(10) Patent No.: US 11,616,380 B2
(45) Date of Patent: Mar. 28, 2023

(54) CHARGING SYSTEM FOR A BATTERY OPERATED MACHINE

(71) Applicant: Caterpillar Inc., Deerfield, IL (US)

(72) Inventors: Jonathan M. Baumann, Hanna City, IL (US); Thomas M. Sopko, Jr., East Peoria, IL (US); Dustin C. Selvey, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1072 days.

(21) Appl. No.: 16/276,035

(22) Filed: Feb. 14, 2019

(65) Prior Publication Data

US 2020/0266633 A1 Aug. 20, 2020

(51) Int. Cl.
*H02J 7/00* (2006.01)
*H01R 31/08* (2006.01)
(Continued)

(52) U.S. Cl.
CPC .............. *H02J 7/007* (2013.01); *B60L 53/14* (2019.02); *B60L 53/16* (2019.02); *B60L 53/302* (2019.02);
(Continued)

(58) Field of Classification Search
CPC .... H02J 7/007; H02J 7/0045; H02J 7/007194; H02J 7/007192; H02J 7/04; B60L 53/14; B60L 53/16; B60L 53/302; B60L 53/60; B60L 2200/40; G01K 7/16; G01K 13/00; H01M 10/44; H01M 10/613; H01M 10/625; H01M 10/63; H01M 2220/20; H01M 2010/4278; H01M 10/425; H01M 10/486;
(Continued)

(56) References Cited

U.S. PATENT DOCUMENTS 3,895,283 A * 7/1975 Peterson ................... H02J 7/32
320/164
4,232,930 A 11/1980 Teti
(Continued)

FOREIGN PATENT DOCUMENTS

CA 2523240 A1 * 4/2007 .......... B60L 11/1874
CN 203386995 U 1/2014
(Continued)

*Primary Examiner* — Abdullah A Riyami
*Assistant Examiner* — Justin M Kratt
(74) *Attorney, Agent, or Firm* — von Briesen & Roper, s.c.

(57) ABSTRACT

A charging system for a battery-operated machine is disclosed. The charging system includes a charging receptacle having a power connection and a signal connection, with the charging receptacle configured to receive electrical current via the power connection from a power supply plug. The charging system further includes a heat rejection element thermally coupled to the charging receptacle, a temperature sensor, and a charging controller operatively coupled to the temperature sensor and the charging receptacle. The charging controller is configured to receive a temperature signal from the temperature sensor, the temperature signal being indicative of a charging-receptacle temperature. The charging controller is further configured to transmit, via the signal connection to the connected plug, a control signal to adjust (e.g., raise or lower) the electrical current supplied to the power connection.

18 Claims, 4 Drawing Sheets

(51) Int. Cl.
| | |
|---|---|
| H01R 13/703 | (2006.01) |
| H01R 13/66 | (2006.01) |
| H01R 24/76 | (2011.01) |
| H01M 10/613 | (2014.01) |
| H01M 10/625 | (2014.01) |
| H01M 10/63 | (2014.01) |
| H01M 10/44 | (2006.01) |
| B60L 53/14 | (2019.01) |
| B60L 53/16 | (2019.01) |
| B60L 53/302 | (2019.01) |
| B60L 53/60 | (2019.01) |
| G01K 7/16 | (2006.01) |
| H01R 13/6471 | (2011.01) |
| H01R 13/52 | (2006.01) |
| H01R 13/60 | (2006.01) |
| H01R 13/625 | (2006.01) |
| H01R 13/64 | (2006.01) |
| H01R 107/00 | (2006.01) |
| G01K 13/00 | (2021.01) |
| H01M 10/42 | (2006.01) |
| H02J 7/04 | (2006.01) |
| H01M 10/48 | (2006.01) |

(52) U.S. Cl.
CPC .............. *B60L 53/60* (2019.02); *G01K 7/16* (2013.01); *H01M 10/44* (2013.01); *H01M 10/613* (2015.04); *H01M 10/625* (2015.04); *H01M 10/63* (2015.04); *H01R 13/6471* (2013.01); *H01R 13/6683* (2013.01); *H01R 13/7031* (2013.01); *H01R 24/76* (2013.01); *H01R 31/08* (2013.01); *H02J 7/0045* (2013.01); *H02J 7/007194* (2020.01); B60L 2200/40 (2013.01); G01K 13/00 (2013.01); H01M 10/425 (2013.01); H01M 10/443 (2013.01); H01M 10/486 (2013.01); H01M 2010/4278 (2013.01); H01M 2220/20 (2013.01); H01R 13/5219 (2013.01); H01R 13/60 (2013.01); H01R 13/625 (2013.01); *H01R 13/64* (2013.01); *H01R 2107/00* (2013.01); *H02J 7/007192* (2020.01); *H02J 7/04* (2013.01); *Y02E 60/10* (2013.01); *Y02T 10/70* (2013.01); *Y02T 10/7072* (2013.01); *Y02T 90/12* (2013.01); *Y02T 90/14* (2013.01)

(58) Field of Classification Search
CPC .............. H01M 10/443; H01R 13/6683; H01R 13/7031; H01R 24/76; H01R 31/08; H01R 13/5219; H01R 13/60; H01R 13/625; H01R 13/64; H01R 2107/00; H01R 13/6471; Y02T 90/12; Y02T 10/70; Y02T 10/7072; Y02T 90/14; Y02E 60/10; G02B 6/4269
USPC ........................................................ 439/487
See application file for complete search history.

(56) References Cited

U.S. PATENT DOCUMENTS

| | | | |
|---|---|---|---|
| 5,714,129 A * | 2/1998 | Nishimura | H01M 10/54 429/49 |
| 6,280,209 B1 * | 8/2001 | Bassler | H01R 13/6473 439/502 |
| 7,641,499 B1 | 1/2010 | George et al. | |
| 8,043,108 B2 | 10/2011 | Engbring et al. | |
| 8,427,103 B2 | 4/2013 | Ohtomo | |
| 9,533,639 B2 | 1/2017 | Farrell | |
| 9,748,695 B2 | 8/2017 | Gibeau | |
| 9,851,387 B2 | 12/2017 | Aceña et al. | |
| 9,969,276 B2 | 5/2018 | Dedona et al. | |
| 2011/0148342 A1 * | 6/2011 | Wahlqvist | H02J 7/0031 320/101 |
| 2019/0334140 A1 * | 10/2019 | Linde | B65D 21/0204 |

FOREIGN PATENT DOCUMENTS

| | | | |
|---|---|---|---|
| CN | 203660014 U | * | 6/2014 |
| CN | 104300597 A | | 1/2015 |

* cited by examiner

CHARGING SYSTEM FOR A BATTERY OPERATED MACHINE

TECHNICAL FIELD

The present disclosure generally systems and methods of charging a battery-operated machine.

BACKGROUND

Battery-operated machines provide many advantages over combustion engine machines. One advantage is that battery-operated machines do not emit combustion byproducts. This advantage is particularly useful in underground mining environments. A combustion-engine underground-mining machine may often be paired with ventilation systems that provide fresh air to the machine and that carry away the combustion exhaust aboveground.

However, battery-operated machines do require periodic charging or a battery swap-out to replenish the energy for the battery-operated machine. This results in down-time for the machine. Thus, any time that the battery-operated machine is being charged leads to less overall productivity of the battery-operated machine since it is typically not operating (e.g., excavating, mining, maneuvering) while it is charging. Some battery-operated machines utilize Lithium-ion batteries and can receive quick electrical charges to attempt to minimize the down-time associated with recharging the machine's batteries. However, the high power and electrical current used to provide a higher charging rate create heat due to electrical resistance.

Chinese Patent 206314142U, entitled Electric Vehicle Charging Socket and Heat Abstractor Thereof, provides for an electric vehicle charging socket and heat abstractor that includes a shield, an electric shock joint, a miniature cooling fan, and a radiating block. The miniature cooling fan is located near heat abstractor attached to the charging socket to carry heat away from the charging socket.

While arguably effective for its intended purpose, there is still need for improved charging systems and methods for battery operated machines.

SUMMARY

In accordance with one aspect of the present disclosure, a charging system for a battery-operated machine includes a charging receptacle having a power connection and a signal connection, with the charging receptacle configured to receive electrical current via the power connection from a power supply plug. The charging system further includes a heat rejection element thermally coupled to the charging receptacle, a temperature sensor, and a charging controller operatively coupled to the temperature sensor and the charging receptacle. The charging controller is configured to receive a temperature signal from the temperature sensor, the temperature signal being indicative of a charging-receptacle temperature. The charging controller is further configured to transmit, via the signal connection to the connected plug, a control signal to adjust (e.g., raise or lower) the electrical current supplied to the power connection.

Another embodiment takes the form of a method of operating a charging system for a battery-operated machine, with the charging system including a charging receptacle having a power connection and a signal connection, a heat rejection element thermally connected to the charging receptacle, a temperature sensor, and a controller. The method includes receiving electrical power at the power connection via a power supply plug, providing, by the temperature sensor to the controller, a temperature signal indicative of a charging-receptacle temperature, and responsive to determining that the temperature signal exceeds a threshold value, the controller transmitting, via the signal connection, a control signal to reduce an electrical current supplied to the power connection.

Yet another embodiment takes the form of a battery-operated machine having a charging receptacle that includes a power connection and a signal connection. The charging receptacle is configured to receive electrical current via the power connection from a power supply plug. The battery-operated machine further includes a heat rejection element that is thermally coupled to the charging receptacle, a temperature sensor configured to detect a heat-rejection-element temperature that is indicative of a charging-receptacle temperature, and a charging controller operatively coupled to the temperature sensor and the charging receptacle. The charging controller is configured to receive a temperature signal from the temperature sensor. The temperature signal of the heat-rejection-element temperature is indicative of a charging-receptacle temperature. The charging controller transmits, via the signal connection, a control signal to adjust the electrical current supplied to the power connection based at least in part on the received temperature signal. The battery-operated machine further includes an engine control unit configured to permit operation of the battery-operated machine responsive to receiving a permissive signal from the charging controller.

These and other aspects and features of the present disclosure will be more readily understood when read in conjunction with the accompanying drawings.

DETAILED DESCRIPTION

Figure 1:
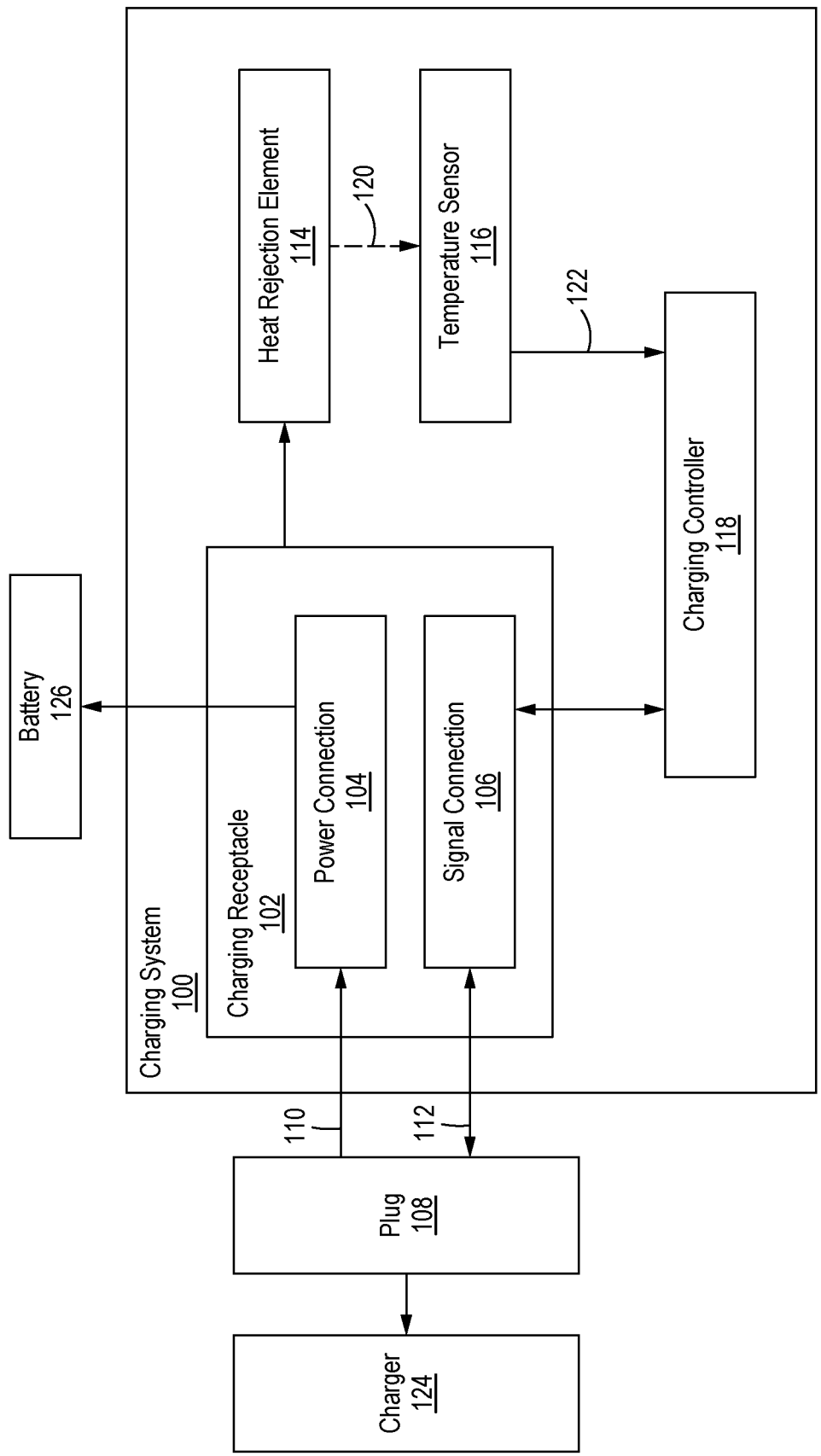
FIG. 1 is a block diagram of a charging system, in accordance with an embodiment of the present disclosure.

Referring now to the drawings, and with specific reference to FIG. 1, a block diagram of a charging system is disclosed, in accordance with an embodiment of the present disclosure. In particular, FIG. 1 depicts the charging system 100 having a charging receptacle 102 that includes a power connection 104 and a signal connection 106. The charging receptacle 102 is configured to receive electrical current 110 via the power connection 104 from a power supply plug 108. The electrical current 110 is provided to the battery 126 of the battery-powered machine. In some embodiments, the electrical current is provided at a power of more than 300 kW and over 300 Amps of DC power.

The charging system 100 further includes a heat rejection element 114 that is thermally coupled to the charging receptacle 102. Non-limiting examples of heat rejection elements include fin-type heat sinks, air-cooled heat-rejection elements, forced-air-cooled heat-rejection elements, heat rejection elements cooled by a fluid cooling system, and the like. The heat rejection element 114 may receive heat generated during a battery charging evolution from the charging receptacle 102 via a variety of means. For example, the charging receptacle 102 may receive heat via conduction by a heat sink thermally coupled or attached to the charging receptacle 102 via a thermal interface material. The charging receptacle 102 may receive heat by convection via a fan moving air over the charging receptacle 102. The charging receptacle 102 may receive heat by a combination of conduction and convection by a heat sink thermally attached to the charging receptacle and the heat sink being cooled by a cooling fluid.

A temperature sensor 116 is configured to determine a receptacle temperature that is indicative of a charging-receptacle temperature, generate a temperature signal associated with the determined temperature, and to provide the temperature signal to a charging controller 118. Non-limiting examples of the temperature sensor 116 include a resistance temperature detector (RTD), an infrared temperature sensor directed at the charging receptacle 102, and the like. The temperature indicative of the charging-receptacle temperature may be a temperature reading that is directly associated with the charging receptacle 102 (e.g., a temperature reading of a surface of the charging receptacle 102 as determined by an infrared temperature sensor, a temperature reading from an RTD disposed on the charging receptacle).

The receptacle temperature may also be a temperature reading indirectly associated with the charging receptacle 102 (e.g., a temperature reading of a surface of a heat rejection element that is thermally coupled to the temperature sensor, a temperature reading from a fluid-cooling system that is cooling the heat rejection element—the temperature reading measured downstream of the heat rejection element, a differential temperature reading of a fluid cooling system that measures the difference between an inlet temperature of the cooling fluid into the heat rejection element as compared to the outlet temperature of the cooling fluid exiting the heat rejection element). An indirect temperature may be related back to the actual charging-receptacle temperature based on the heat transfer properties of a thermal connection between the charging receptacle 102 and the object (e.g., the heat-rejection element) that the temperature sensor 116 is measuring. The temperature sensor 116 may be configured to detect a heat-rejection-element temperature 120 that is indicative of a charging-receptacle temperature.

One limiting parameter affecting the electrical charging rate may be a temperature of the charging receptacle 102. However, in addition to the materials of the charging receptacle 102 having individual temperature limits that may be exceeded during a charge, the charging-receptacle temperature may be a precursor to battery temperature limits, and as such be used as an earlier indication of high temperature conditions of the battery 126. Adding the heat rejection element 114 to the charging receptacle 102 provides for a greater heat transfer away from the charging receptacle 102 and increases the likelihood that the temperature limits of the charging receptacle 102 will not be exceeded, and thus allows for the receptacle temperature to be used as a leading indication for high battery temperature conditions.

A threshold temperature limit can be determined based on the physical and thermodynamic properties of the charging system 100 and the properties of the battery 126 such that the threshold temperature limit of the charging receptacle 102 may be used to provide for an adequate safety factor for the battery temperature during battery charges. As the battery 126 is charged via electrical current 110 received via the charging receptacle 102, both the battery 126 and the charging receptacle 102 may experience a temperature rise that is based on the rate of the electrical charge (e.g., the power of the charge). While the charging receptacle 102 is expected to increase in temperature due to electrical resistance, the battery 126 may increase in temperature in part due to a byproduct of the electro-chemical reaction of charging the battery 126. As such, the rise of the battery temperature may lag the rise of the rise of the charging-receptacle temperature. Further, the temperature design limits of the battery 126 may be related to the rate of charge received via the charging connection, and as such may also be related to the charging-receptacle temperature.

The charging system 100 includes the charging controller 118 to control and monitor the receptacle temperature. The charging controller 118 is operatively coupled to the temperature sensor 116 and the charging receptacle 102. The charging controller 118 is configured to receive a temperature signal 122, generated by temperature sensor 116, that is associated with the receptacle temperature. The temperature signal 122 is indicative (directly or indirectly) of a charging-receptacle temperature. The charging controller 118 is further configured to transmit, via the signal connection 106, a control signal 112 to adjust the electrical current 110 supplied to the power connection 104. In various embodiments, the charging controller 118 may be realized by any standard controller that is configured to perform the or carry out the actions disclosed herein. Example controllers that may be configured to serve as the charging controller 116 include a microprocessor-based controller, an FPGA, and the like.

In some embodiments, the adjustment of the electrical current 110 includes transmitting a control signal 112 to reduce the electrical current 110 (i.e., reducing the charging rate) in response to determining that the charging-receptacle temperature exceeds a threshold value. In other embodiments, the adjustment comprises raising the electrical current 110 (i.e., raising the charging rate) in response to determining that the charging-receptacle temperature is less than a threshold value.

In some embodiments, the receptacle temperature control is independent of a battery temperature control the vehicle may be equipped with. An independent monitoring system provides for the receptacle temperature acting as a first line of defense, or failsafe, to ensure that charging rates that may adversely affect the battery are not exceeded. The charging controller 118 may also be configured to transmit the control signal 112 independent of a battery temperature of the battery-operated machine 702. In such embodiments, the charging controller 118 uses the charging-receptacle temperature as a precursor for the battery temperature as the battery temperature may be expected to lag the charging-receptacle temperature. Thus, the charging controller 118 transmits the control signal 112 to adjust the electrical current 110 based on the charging-receptacle temperature rather than based on a battery temperature.

In some embodiments, the control signal 112 adjusts the electrical current 110 supplied to the power connection 104. The control signal may be configured to reduce the electrical current 110 by an amount related to the amount the temperature exceeds a target temperature value. In one such example, the charging system 100 is receiving an electrical current 110 at a first value (e.g., 500 amps) and the charging receptacle 102 is at a target temperature associated with a maximum desired charging rate of the battery 126 based on expected thermal performance of the battery 126. If the charging-receptacle temperature exceeds the target temperature by one degree, the charging controller 118 transmits a control signal 112 to adjust the electrical current 110 to a second value (e.g., reduce by 10 amps to 490 amps). If the charging-receptacle temperature continues to rise (e.g., by one more degree for a total of two degrees above the target temperature), the charging controller 118 transmits a control signal 112 to further adjust the electrical power to a third value (e.g., reduce the electrical current 110 by another 30 amps to 460 amps). As the charging-receptacle temperature returns to the target temperature (e.g., as a result of a reduced charge rate), the charging controller 118 proceeds to transmit a subsequent control signal 112 to further adjust the electrical current 110 (e.g., raise the electrical current 110).

In various embodiments, the heat rejection element 114 includes a heat sink disposed on a back surface (e.g., back surface 228) that is opposite of a location of a power supply plug 108 when connected to the charging receptacle 102. The temperature sensor 116 detects a heat-sink temperature, and the heat-sink temperature is indicative (indirectly) of the charging-receptacle temperature.

In yet another embodiment, the heat rejection element 114 includes a fluid cooling system, and the temperature sensor 116 is configured to detect a temperature of a fluid in the fluid cooling system, with the temperature of the fluid being indicative of the charging-receptacle temperature. The fluid temperature may be taken at an outlet of the fluid cooling system before it is mixed with fluid flow from other-cooled components, or it may alternatively be a differential temperature of the cooling fluid taken across the heat-rejection element.

The temperature sensor 116 may be realized by an infrared temperature sensor that is configured to provide the temperature signal indicative of the charging-receptacle temperature to the charging controller 118. This may be realized by orienting the infrared temperature sensor at a back surface 228 of the charging receptacle 102, at a heat rejection element 114, or the like.

In other embodiments, the temperature sensor 116 may be an RTD detector disposed on the heat rejection element 114, or on the charging receptacle 102, with the temperature signal from the RTD detector being indicative, indirectly or directly, of the charging-receptacle temperature. As discussed above, the charging controller 118 may be configured to transmit the control signal 112 independent of a battery temperature of the battery-operated machine 702.

Figure 2A:
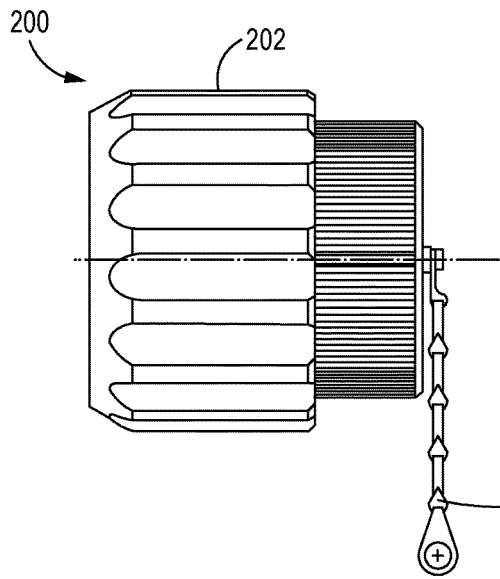
FIGS. 2A-2C depict a plurality of views of a charging receptacle cap, a charging receptacle, and a charging plug, in accordance with an embodiment of the present disclosure.
Figure 2A:
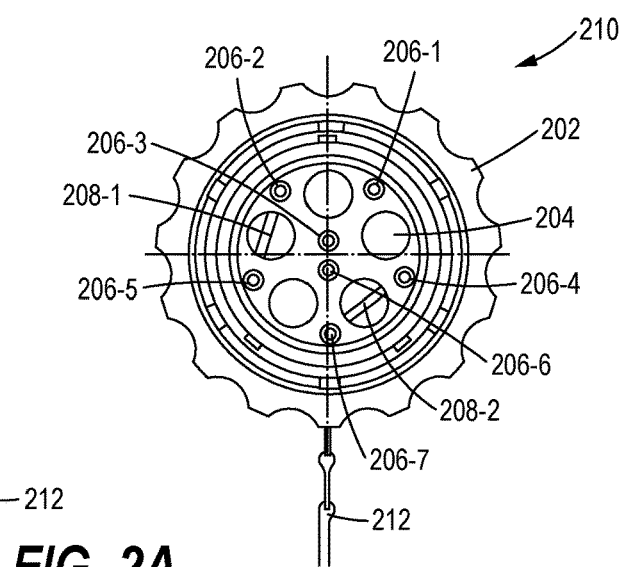
Figure 2B:
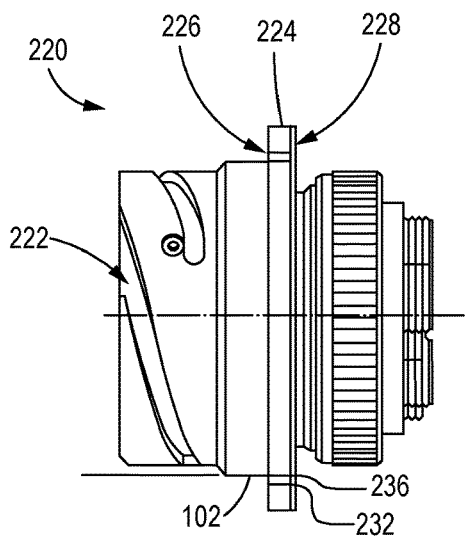
Figure 2B:
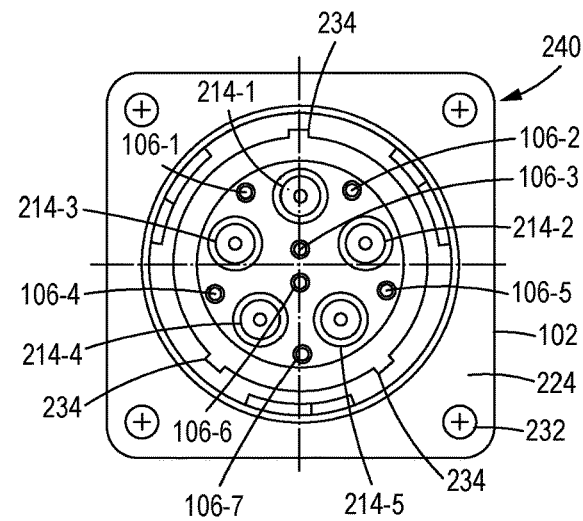
Figure 2C:
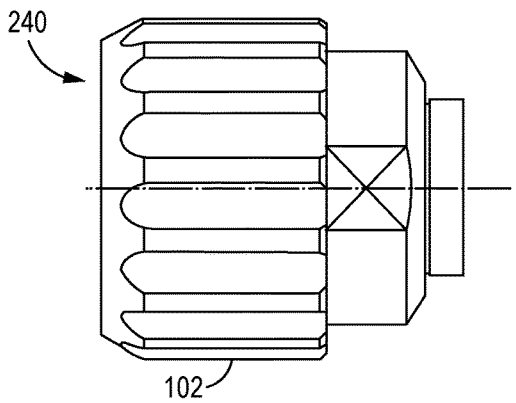
Figure 2C:
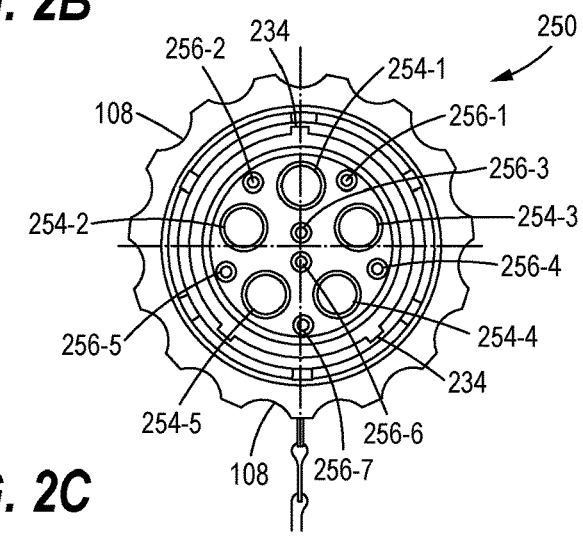

FIGS. 2A-C depict a plurality of views of a charging receptacle cap, a charging receptacle, and a power plug, in accordance with an embodiment of the present disclosure. In particular, the views 200 and 210 of FIG. 2A depict a side view and a front view of a charging cap 202, respectively. The charging cap 202 may include a cylindrical shorting plug having a reverse bayonet coupling system for securely attaching to the bayonet locking feature 222 of the charging receptacle 102. The charging cap 202 may provide for ingress protection (e.g., protection against water and particulate matter from entering an electrical casing of the battery-operated machine) when installed on the charging receptacle 102. The ingress protection may be realized by a gasket (not depicted) internal to the charging cap 202 sealing with the charging receptacle 102 when the features of the bayonet coupling system compress the gasket.

The charging cap 202 includes a plurality of signal cavities 206-1 to 206-7 within an insert, although other quantities and arrangements of signal cavities may be used. The signal cavities 206 may include signal contacts installed therein. For example, a size 16 contact may be inserted into select signal cavities 206 and be configured to be attached (e.g., crimped) to a 16 AWG insulated jumper wire between select cavities. The jumper wire provides an electrical connection (e.g., a short) between the select cavities. When connected to the contacts, the jumper wire may also be referred to as a bridging element. In one example, a first jumper wire 208-1 may be installed between contacts in the signal cavities 206-2 and 206-5 to provide an electrical short between the signal cavities 206-2 and 206-5. A second jumper wire 208-2 may similarly be installed between contacts in the signal cavities 206-4 and 206-7.

As used throughout in reference to the various signal and power electrical connections, the like-numbered '-n' suffix for the different signal and power electrical connections are intended to provide for electrical connections across different components. For example, the a plug power conductor 254-3 of the power supply plug 108 electrically connects with the power conductor 214-3 of the charging receptacle 102 when connected.

The charging cap 202 may further include a plurality of power cavities 204 within the insert that correspond to a location of conductors of a power connection 104 in the charging receptacle 102. In some embodiments, the power cavities 204 of the charging cap 202 are unused (e.g., do not have an associated power contact installed). Also depicted in the views 200 and 210 is a retention chain 212 that is connected at a first end of the chain to an outer surface of the charging cap 202. The second end of the chain is configured to be attached to the battery-operated machine 702 in the vicinity of the charging receptacle 102 to prevent loss of the charging cap 202 and to further facilitate replacement of the charging cap 202 onto the charging receptacle 102 when the power supply plug 108 is not connected.

The views 220 and 230 of FIG. 2B depict a side view and a front view, respectively, of a charging receptacle 102, in accordance with an embodiment. The charging receptacle 102 includes a bayonet locking feature 222 that interacts with a complementary feature on either the charging cap 202 or the power supply plug 108 to provide for positive engagement and tight sealing with the charging receptacle 102. The charging receptacle 102 may further include a keying feature 234 to ensure proper alignment of either the charging cap 202 or the power supply plug 108 with the charging receptacle 102.

In some embodiments, the charging receptacle 102 includes a flange 224 that includes a front surface 226 and a back surface 228. The flange 224 is configured to abut against an exterior wall of the battery-operated machine 702 and to be fastened to the battery-operated machine via the connector-holes 232. A gasket 236 may be installed on the back surface 228 to provide ingress protection between the charging receptacle 102 and the battery-operated machine 702.

The charging receptacle 102 may further include a plurality of power and signal cavities within an insert that may be configured to receive power and signal conductors as part of the power connection 104 and the signal connection 106, respectively. The locations of the power and signal cavities are arranged within the cavity to align with like-numbered conductors from the charging cap 202 and the power supply plug 108.

Here, the charging receptacle 102 includes five power conductors 214-1 to 214-5 and seven signal conductors 106-1 to 106-2. Of the power conductors 214-1 to 214-5, two of the power conductors may provide for a DC positive bus electrical connection (e.g., power conductors 214-3 and 214-5), two of the power conductors may provide for a DC negative bus electrical connection (e.g., power conductors 214-2 and 214-4), and one of the power conductors may provide for a ground path (e.g., power conductor 214-1). Such an arrangement of the power conductors 214-$n$ relative to each other and the signal conductors 106-$n$ may serve to reduce electrical noise imparted on the signal connection 106 from the power connection 104.

The power conductors 214 may be configured to receive electrical current from a power supply plug 108 having conductors with a diameter of 5.8 mm (e.g., AWG gauge 3 wire), or larger. The power connection 104 may be configured to receive 350 kW, or more, of electrical power. As such, the power conductors 214 are selected to be an appropriately sized conductor to receive the electrical current 110 from the power supply plug 108.

The views 240 and 250 of FIG. 2C depict a side view and a front view of a power supply plug 108, respectively, in accordance with an embodiment. Similar to the charging cap 202 and the charging receptacle 102, the power supply plug includes a plurality of power and signal cavities within an insert that are arranged to receive power and signal conductors. Here, the plug power conductors 254-1 to 254-5 are arranged within the cavity, and with respect to the keying feature 234, to mate with the power conductors 214-1 to 214-5 within the charging receptacle 102. The signal conductors 256-1 to 256-7 are similarly disposed within the cavity to mate with the signal conductors 106-1 to 106-7 of the charging receptacle 102.

The length of the plug power conductors 254-1 to 254-5 and the signal conductors 256-1 to 256-7 may be varied to provide for first/last make/break connections. For example, a plug power conductor 254 associated with a grounding path has the longest length, so that it is the first conductor within the power supply plug 108 to mate (e.g., connect electrically) with the associated conductor in the charging receptacle 102 when inserting the power supply plug 108. As such, it is the last conductor in the power supply plug 108 to break (e.g., disconnect electrically) with the conductor in the charging receptacle 102 when unplugging the power supply plug 108.

The plug power conductors 254 associated with the DC positive bus and the DC negative bus may be designed to be the second set of conductors to mate and break upon plugging and unplugging, respectively, the power supply plug 108 to/from the charging receptacle 102. Finally, the signal conductors 106 may be the last to mate and the first to break upon plugging and unplugging, respectively, the power supply plug 108 from the charging receptacle 102.

In some embodiments, the battery-operated machine 702 includes a plurality of charging receptacles 102, and the battery 126 is configured to receive the electrical current 110 via each of the charging receptacles 102 in the plurality of charging receptacles. In a baseline embodiment, the battery 126 is charging at a baseline charging rate with the electrical current 110 being provided via a single charging receptacle 102 receiving all of the electrical current 110. However, in an embodiment with two charging receptacles 102, each charging receptacle 102 may receive approximately one-half of the electrical current 110 and still charge the battery 126 at the baseline charging rate.

In the baseline embodiment, the charging controller 118 transmits control signals to adjust the electrical current 110 based on the charging-receptacle temperature of a single charging receptacle 102. However, in the multi-charging-receptacle embodiment, the charging controller 118 transmits control signals to adjust the electrical current based on the charging-receptacle temperature of each of the charging receptacles 102 that is receiving the electrical current 110. The charging receptacles 102 in multi-charging receptacle embodiment are expected to have a lower charging-receptacle temperature as compared to the baseline embodiment because each charging receptacle 102 of the plurality of charging receptacles is carrying a fraction of the electrical current 110.

However, as the battery 126 is still being charged at the same baseline rate in each embodiment, the charging controller 118 may determine to transmit different control signals 112 for a given charging-receptacle temperature because the charging-receptacle temperatures are being used as a proxy for the battery temperature. Determining the different control signals 112 based on the number of charging receptacles 102 receiving electrical current 110 may be based at least in part on determining a number of charging receptacles 102 that are being used to charge the battery 126 and retrieving control signal values from a look-up table associated with the number of charging receptacles 102 being used to charge the battery 126. The same control signal 112 may be sent via each charging receptacle 102 to adjust the electrical current 110 in equal amounts to each of the charging receptacles 102. Alternatively, the control signals 112 may be independent from each other and control the electrical current 110 to each charging receptacle 102 individually.

Figure 3:
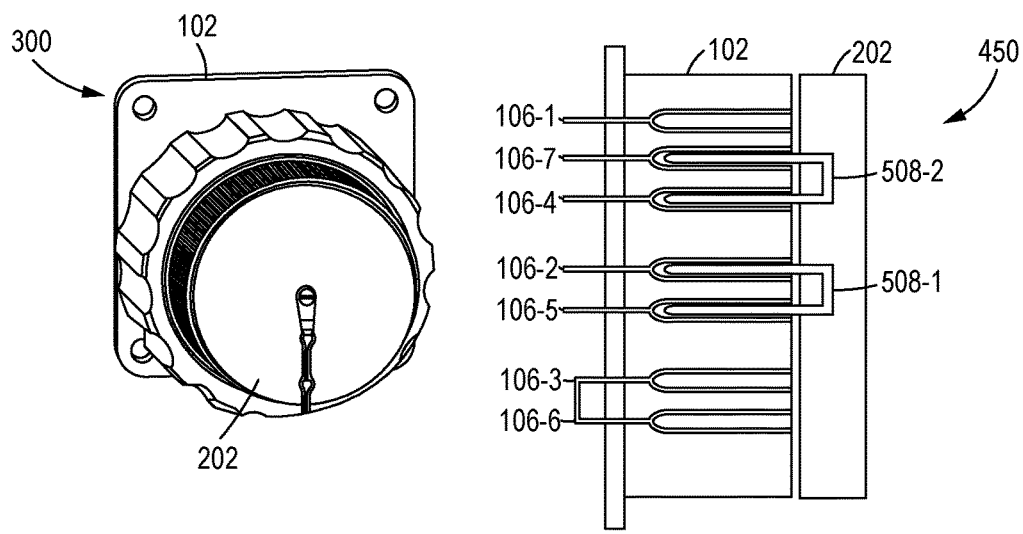
FIG. 3 depicts a perspective view of a capped charging receptacle and an associated wiring diagram of the capped charging receptacle, in accordance with an embodiment of the present disclosure.

FIG. 3 depicts a perspective view of a capped charging receptacle and an associated wiring diagram of the capped charging receptacle, in accordance with an embodiment of the present disclosure. In particular, FIG. 3 depicts the perspective view 300 of the charging cap 202 mated with the charging receptacle 102. The view 350 depicts the wiring diagram of the signal conductors 106 of the charging receptacle 102 on the left, and the components of the charging cap 202 on the right. Here, the charging cap 202 includes the first jumper wire 208-1 and the second jumper wire 208-2 discussed above in conjunction with FIG. 2. Here, the first and second jumper wires 208-1 and 208-2 act as bridging elements that short an electrical connection between at least one pair of signal conductors in the plurality of signal conductors in the charging receptacle. Here, the signal conductors 106-7 and 106-4 are shorted by the second jumper wire 208-2 and the signal conductors 106-2 and 106-5 are shorted by the first jumper wire 208-1. The charging controller 118 detects a short of these pairs of signal conductors, and is thus able to determine that the charging receptacle 102 is in a capped position (e.g., is mated with the charging cap 202).

The charging controller 118 may further be configured to permit operation of the battery-operated machine 702 in response to determining that at least one pair of the signal conductors 106-$n$ is shorted that corresponds with the charging cap 202 being installed. Operation of the battery-operated machine implies that the battery-operated machine is able to maneuver, energize working implements, and the like, and otherwise expend electrical energy from the battery 126 in its operation.

Figure 4:
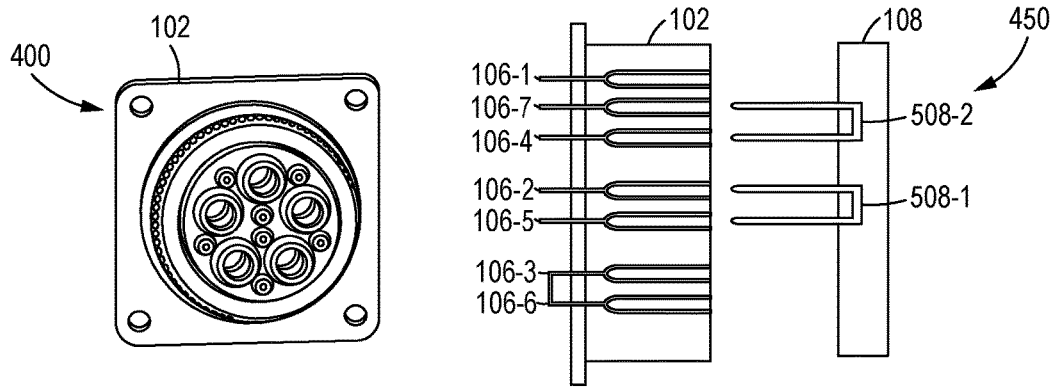
FIG. 4 depicts a perspective view of an uncapped charging receptacle disconnected from a plug and an associated wiring diagram of the charging receptacle, in accordance with an embodiment of the present disclosure.

FIG. 4 depicts a perspective view of an uncapped charging receptacle disconnected from a plug and an associated wiring diagram of the charging receptacle, in accordance with an embodiment of the present disclosure. In particular, FIG. 4 depicts the perspective view 400 of the charging receptacle 102 alone on the left and the associated wiring diagram 450 on the right. As compared to the capped charging receptacle 102 of FIG. 3, here, no pairs of signal conductors are shorted as nothing is mated with the charging receptacle 102 to short the pairs of signal conductors 106. In such a configuration, the charging controller 118 may be further configured to permit shutdown of various auxiliary services (e.g., a battery cooling system) of the battery-operated machine 702.

Figure 5:
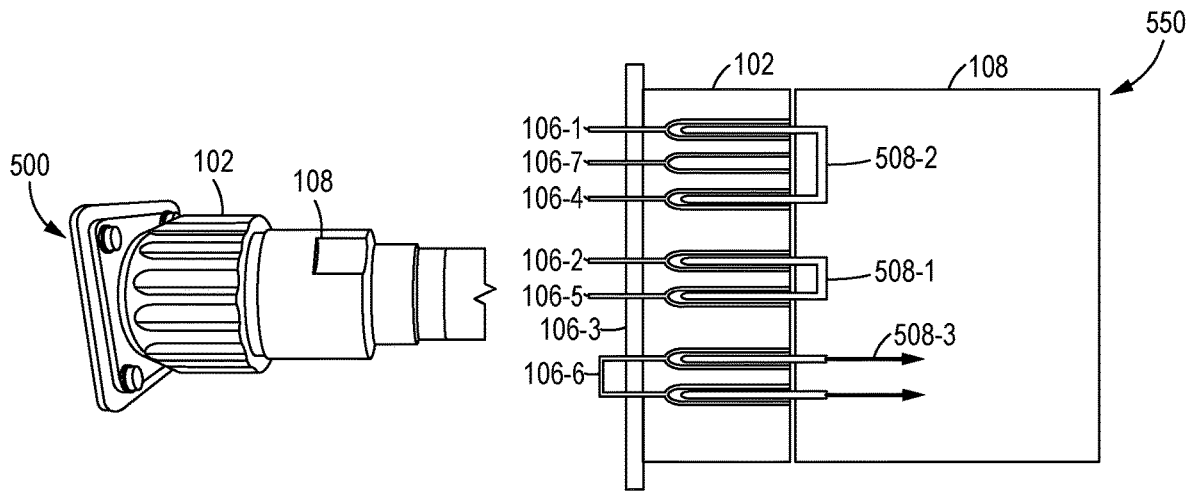
FIG. 5 depicts a perspective view of the charging receptacle connected to a plug and an associated wiring diagram of the charging receptacle and plug, in accordance with an embodiment of the present disclosure.

FIG. 5 depicts a perspective view of the charging receptacle connected to a plug and an associated wiring diagram of the charging receptacle and plug, in accordance with an embodiment of the present disclosure. In particular, FIG. 5 depicts the perspective view 500 of the charging receptacle 102 mated with the power supply plug 108 on the left, and the associated wiring diagram 550 of the signal conductors of the charging receptacle 102 interacting with the signal conductors 256 of the plug. Similar to the jumper wires 208 of the charging cap 202, the power supply plug 108 may further be configured with a first plug-jumper wire 508-1 that is configured to short an electrical connection between the signal conductors 106-2 and 106-5 (e.g., the same pair shorted by the first jumper wire 208-1 of the charging cap 202). However, the second plug-jumper wire 508-2 is configured to short an electrical connection between the signal conductors 106-1 and 106-4 (e.g., different from the pair shorted by the second jumper wire 208-2 of the charging cap 202).

Based on a shorting of an electrical connection between this particular pair of signal conductors 106 by the second plug-jumper wire 508-2, the charging controller 118 may be configured to determine that the power supply plug 108 is connected to the charging controller 118 and responsively activate auxiliary services of the battery-operated machine. One example auxiliary service includes a battery cooling system. As the charging receptacle 102 is presumably connected to a charger via the power supply plug 108 based on the second plug-jumper wire 508-2 shorting the particular pair of signal conductors 106, the auxiliary services used during a battery charge are thus activated in preparation for receiving a battery charge.

In some embodiments, the charging controller 118 is further configured to prohibit full operation of the battery-operated machine 702 based on the determination that the power-supply plug is installed into the charging receptacle 102. As the charging receptacle 102 is presumably connected to a charger via the power supply plug 108, motion of the battery-operated machine 702 is prohibited to prevent the battery-operated machine 702 from moving too far away from the charger and thus exerting a tensile force on the charging cables.

INDUSTRIAL APPLICABILITY

In general, the teachings of the present disclosure may find applicability in many battery-operated machine applications. For instance, the teachings of the present disclosure may be applicable to underground mining machines of differing sizes and capacities, electric-powered automobiles, and the like. Such teachings may provide for faster charging times and increased safety during the battery charges. In one example, the method 600 of FIG. 6 may be utilized with any charging system, and is applied by way of example to the battery-operated machine 702 depicted in the view 700 of FIG. 7.

Figure 6:
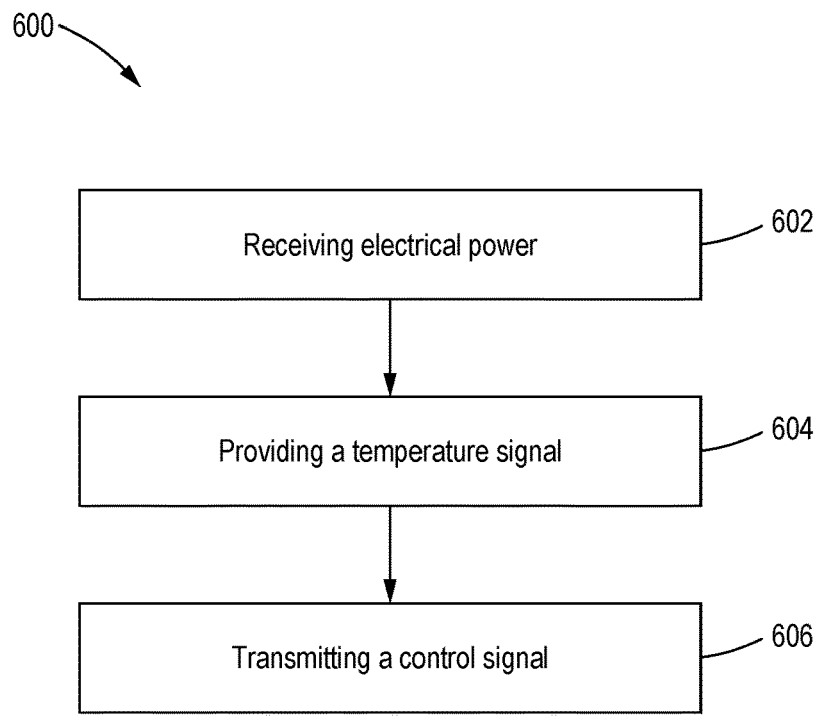
FIG. 6 depicts a method of charging a battery-operated machine, in accordance with an embodiment of the present disclosure.

FIG. 6 depicts a method of charging a battery-operated machine, in accordance with an embodiment of the present disclosure. In particular, FIG. 6 depicts the method 600 that includes receiving electrical power at block 602, providing a temperature signal at block 604, and transmitting a control signal at block 606. The method 600 may be implemented with a charging system, such as the charging system 100 that includes the charging receptacle 102, the heat rejection element 114 that is thermally connected to the charging receptacle 102, the temperature sensor 116, and a charging controller 118.

Figure 7:
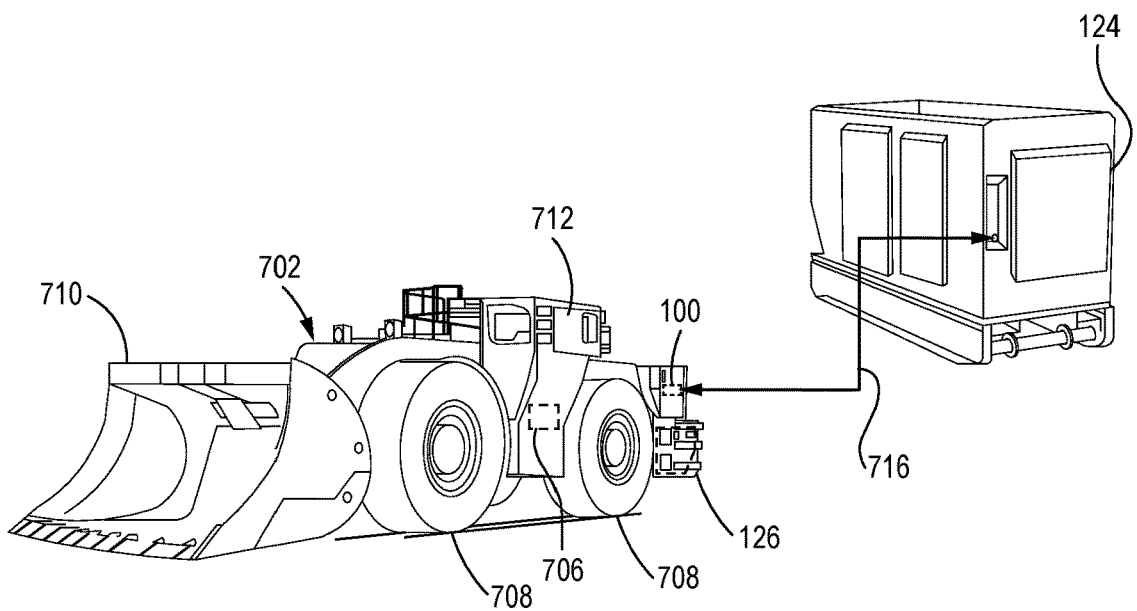
FIG. 7 depicts a battery-operated machine connected to a charger, in accordance with an embodiment of the present disclosure.

FIG. 7 depicts a battery-operated machine connected to a charger, in accordance with an embodiment of the present disclosure. In particular, in the view 700 the battery-operated machine 702, having the charging system 100, is being charged by a charger 124 via a power cord 716. The battery-operated machine 702 includes a battery 126, the charging system 100, an engine control unit 706, a pair of ground engaging members 708, a work implement 710, and an operator station 712. The ground engaging members 708 and the work implement 710 may be powered by the battery 126 during normal operations of the machine to maneuver the battery-operated machine 702 and to perform work in the working environment. Operation of the ground engaging members 708 and the work implement 710 may controlled by the engine control unit 706. The engine control unit 706 may receive a permissive-signal from the charging controller 118 (e.g., responsive to determining particular pairs of signal conductors 106-n are shorted by a bridging element) to be permit operations of the work implement 710 and the ground engaging members 708 when a charging cap 202 is connected to the charging receptacle 102. Alternatively, the engine control unit 706 may receive a prohibition-signal from the charging controller 118 (e.g., responsive to determining that another particular pair of signal conductors 106-n are shorted by a bridging element) to prohibit operations of work implement 710 and the ground engaging members 708 when a power supply plug 108 is connected to the charging receptacle 102.

The charger 124 may receive any electrical power from a grid source that provides AC or DC power of various phase, voltage, frequencies, currents, and the like. The charger 124 is configured to convert the received electrical power into the electrical current 110 used to charge the battery 126. In one non-limiting embodiment, the charger 124 receives 600 VAC electrical power and converts the received electrical power to 700 VDC, supplied at 500 amps, to the charging receptacle 102. The electrical current 110 is provided via the power cord 716 to the power supply plug 108. The power supply plug 108 is connected to the charging receptacle 102 of the charging system 100. Although not depicted, it is envisioned that the electrical current 110 proceeds from the charging receptacle 102 via different electrical busses to the battery 126. Electrical power from the battery 126 may be provided to various inverters and converters before providing power to the various loads (e.g., the ground engaging members 708 or the work implement 710), or to the various auxiliary services (e.g., the battery cooling system). The battery-operated machine 702 may be controlled via the operator station 712, or it may be controlled remotely.

Returning to the discussion of the method 600, in conjunction with the battery-operated machine 702 depicted in the view 700, electrical current 110 is received at the power connection 104 of the charging receptacle 102, via the power supply plug 108, at block 602. For example, electrical current 110 may be transferred from the two DC positive bus plug power conductors 254 and the two DC negative bus plug power conductors 254 to the associated positive and negative power conductors 214-n of the charging receptacle 102.

As the battery 126 is charged, the temperature of the charging receptacle 102 increases due to the electrical current 110 flowing through the various conductors. The temperature sensor 116 monitors for a temperature indicative of the charging-receptacle temperature. For example, it may monitor an indirect temperature of the heat rejection element 114 or a direct temperature of the charging receptacle 102. At block 604, the temperature sensor 116 provides, to the charging controller 118, a temperature signal that is indicative of a charging-receptacle temperature.

Responsive to determining that the temperature signal exceeds a threshold value, the charging controller transmits, via the signal connection 106, a control signal 112 to reduce an electrical current 110 supplied to the power connection 104 at block 606. In other embodiments, the charging controller 118 is configured to transmit a control signal 112 to adjust (e.g., raise or lower) the electrical current 110 based on the received temperature signal 122. The charging system 100 may also increase current to meet the threshold as well, in some embodiments.

From the foregoing, it can be seen that the present disclosure sets forth a charging system for a battery operated machine. Moreover, it provides for a means to monitor a receptacle temperature, directly or indirectly, and to control a rate of charge (e.g., the electrical current) to the battery based on the receptacle temperature.

What is claimed is:

1. A charging system for a battery-operated machine that includes a battery, the charging system comprising:
    a charging receptacle disposed in the electrical current flowpath between the battery and a power supply plug, the charging receptacle having a power connection and a signal connection, the charging receptacle configured to receive electrical current via the power connection from the power supply plug;
    a heat rejection element thermally coupled to the charging receptacle;
    a temperature sensor; and
    a charging controller operatively coupled to the temperature sensor and the charging receptacle, the charging controller configured to:
    receive a temperature signal from the temperature sensor, the temperature signal indicative of a charging-receptacle temperature; and
    transmit, via the signal connection to the power supply plug, a control signal to adjust the electrical current supplied to the power connection,
    wherein the charging controller is configured to transmit the control signal independent of a battery temperature of the battery-operated machine.

2. The charging system of claim 1, wherein the power supply plug comprises conductors having a diameter of at least 5.8 mm and the charging system is configured to receive 350 kW of electrical power, or more.

3. The charging system of claim 1, wherein the temperature sensor is configured to detect a heat-rejection-element temperature indicative of the charging-receptacle temperature.

4. The charging system of claim 3, wherein the heat rejection element comprises a heat sink disposed on a back surface of the charging receptacle that is opposite of the power supply plug.

5. The charging system of claim 1, wherein the heat rejection element comprises a fluid cooling system.

6. The charging system of claim 1, wherein the temperature sensor is an infrared temperature sensor configured to provide the temperature signal indicative of the charging-receptacle temperature to the charging controller.

7. The charging system of claim 1, wherein the temperature sensor is a resistance temperature detector (RTD) disposed on the heat rejection element, and the temperature signal from the RTD is indicative of the charging-receptacle temperature.

8. The charging system of claim 1, wherein the control signal to adjust the electrical current supplied to the power connection is configured to reduce the electrical current by an amount related to the amount the temperature signal exceeds a target temperature.

9. The charging system of claim 1, wherein power conductors of the power connection are configured in relation to the signal conductors of the signal connection to reduce noise imparted on the signal connection.

10. A charging system for a battery-operated machine that includes a battery, the charging system comprising:
    a charging receptacle disposed in the electrical current flowpath between the battery and a power supply plug, the charging receptacle having a power connection and a signal connection, the charging receptacle configured to receive electrical current via the power connection from the power supply plug;
    a heat rejection element thermally coupled to the charging receptacle;
    a temperature sensor; and
    a charging controller operatively coupled to the temperature sensor and the charging receptacle, the charging controller configured to:
    receive a temperature signal from the temperature sensor, the temperature signal indicative of a charging-receptacle temperature; and
    transmit, via the signal connection to the power supply plug, a control signal to adjust the electrical current supplied to the power connection, wherein:
    the signal connection comprises a plurality of signal conductors;
    the charging receptacle is configured to receive a cap, the cap having a bridging element configured to short an electrical connection between at least one pair of signal conductors in the plurality of signal conductors; and
    the charging controller is further configured to permit operation of the battery-operated machine in response to determining that the at least one pair of signal conductors in the plurality of signal conductors are shorted.

11. A charging system for a battery-operated machine that includes a battery, the charging system comprising:
    a charging receptacle disposed in the electrical current flowpath between the battery and a power supply plug, the charging receptacle having a power connection and a signal connection, the charging receptacle configured to receive electrical current via the power connection from the power supply plug;
    a heat rejection element thermally coupled to the charging receptacle;
    a temperature sensor; and a charging controller operatively coupled to the temperature sensor and the charging receptacle, the charging controller configured to:

receive a temperature signal from the temperature sensor, the temperature signal indicative of a charging-receptacle temperature; and transmit, via the signal connection to the power supply plug, a control signal to adjust the electrical current supplied to the power connection, wherein responsive to detecting the power supply plug is connected, the charging controller is configured to activate auxiliary services of the battery-operated machine.

12. The charging system of claim 11, wherein the auxiliary services comprise a battery cooling system.

13. A method of operating a charging system of a battery-operated machine that includes a battery, the charging system comprising a charging receptacle having a power connection and a signal connection; a heat rejection element thermally connected to the charging receptacle, a temperature sensor and a charging controller, the method comprising:

receiving electrical power at the power connection via a power supply plug;

providing, by the temperature sensor to the charging controller, a temperature signal indicative of a charging-receptacle temperature; and responsive to determining that the temperature signal exceeds a threshold value, the charging controller transmitting, via the signal connection, a control signal to reduce an electrical current supplied to the power connection wherein the charging receptacle is disposed in the electrical current flowpath between the battery and the power supply plug, wherein the charging controller is configured to transmit the control signal independent of a battery temperature of the battery-operated machine.

14. The method of claim 13, wherein the heat rejection element comprises a heat sink disposed on a back surface opposite of the power supply plug, the temperature sensor is configured to detect a heat-sink temperature, and the heat-sink temperature is indicative of the charging-receptacle temperature.

15. The method of claim 13, wherein the heat rejection element comprises a fluid cooling system, the temperature sensor is configured to detect a temperature of a fluid in the fluid cooling system, and the temperature of the fluid is indicative of the charging-receptacle temperature.

16. The method of claim 13, wherein the temperature sensor is an infrared temperature sensor configured to provide the temperature signal indicative of the charging-receptacle temperature to the charging controller.

17. The method of claim 13, wherein the temperature sensor is a resistance temperature detector (RTD) disposed on the heat rejection element, and the temperature signal from the RTD is indicative of the charging-receptacle temperature.

18. A battery-operated machine comprising:

a charging receptacle having a power connection and a signal connection, the charging receptacle configured to receive electrical current via the power connection from a power supply plug;

a heat rejection element thermally coupled to the charging receptacle;

a temperature sensor configured to detect a heat-rejection-element temperature indicative of a charging-receptacle temperature;

a charging controller operatively coupled to the temperature sensor and the charging receptacle, the charging controller configured to:

receive a temperature signal from the temperature sensor, the temperature signal indicative of the charging-receptacle temperature; and transmit, via the signal connection, a control signal to adjust the electrical current supplied to the power connection; and an engine control unit configured to permit operation of the battery-operated machine responsive to receiving a permissive signal from the charging controller.

* * * * *